Jan. 7, 1947.  R. A. NOBLE  2,413,992
APPARATUS FOR PERFORMING MACHINE OPERATIONS
Filed March 30, 1945   3 Sheets-Sheet 1

INVENTOR.
Ross A. Noble
BY

FIG. 4.
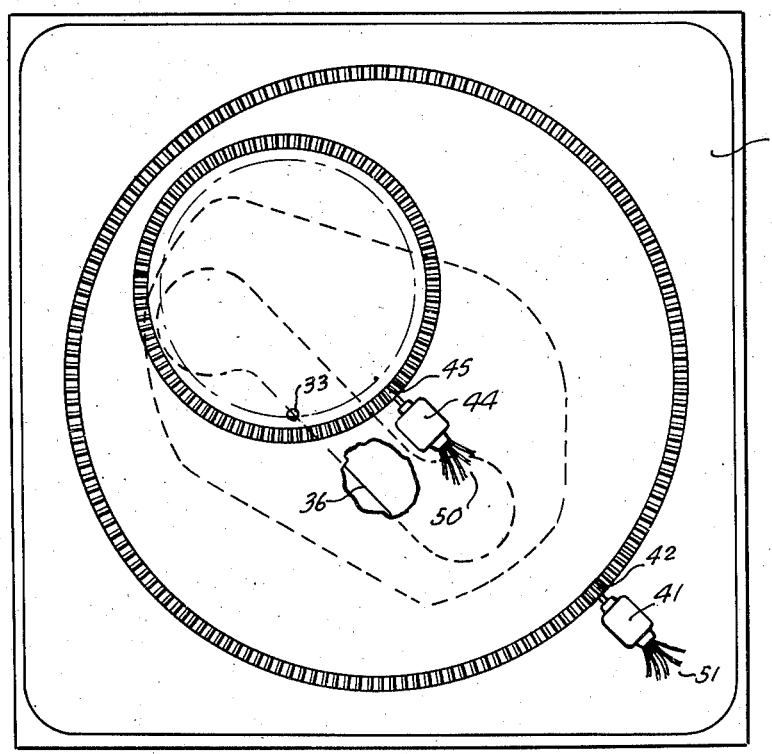
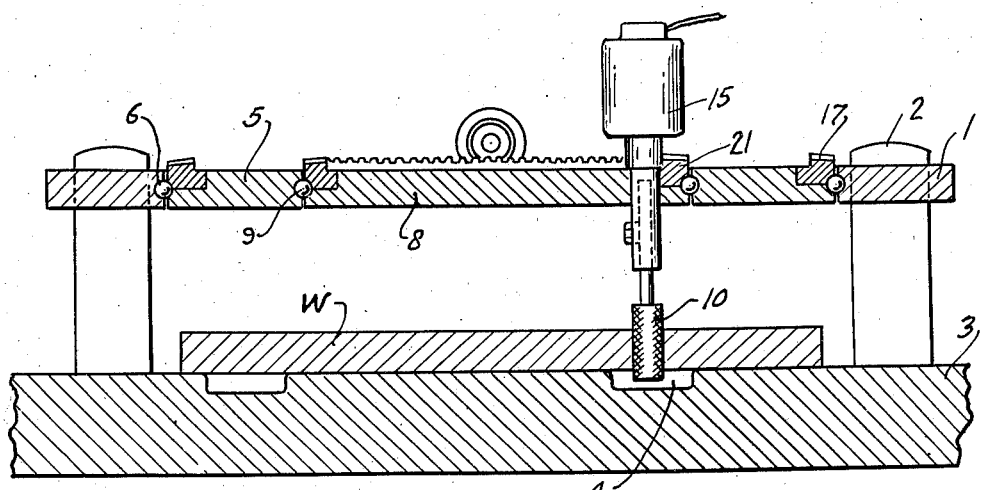
FIG. 7.
INVENTOR.
Ross A. Noble

Jan. 7, 1947.    R. A. NOBLE    2,413,992
APPARATUS FOR PERFORMING MACHINE OPERATIONS
Filed March 30, 1945    3 Sheets-Sheet 3

INVENTOR.
Ross A. Noble
BY

Patented Jan. 7, 1947

2,413,992

UNITED STATES PATENT OFFICE 2,413,992

APPARATUS FOR PERFORMING MACHINE OPERATIONS

Ross A. Noble, Detroit, Mich.

Application March 30, 1945, Serial No. 585,770

2 Claims. (Cl. 90—13.4)

This invention relates to an apparatus for performing machine operations on work pieces and it has to do particularly with an apparatus for cutting shapes from work pieces.

Many examples could be recited where shaped pieces or elements are cut from blanks or work pieces. One example is where a large panel or sheet-like element is cut from a larger work piece in the construction of airplanes. This has been done and is now being done by what is commonly called a routing machine. Briefly, such a machine includes a cutting tool mounted for movement and it is moved in a path relative to the work so that the desired piece is cut therefrom. In other industries there are numerous places where various devices and machine elements may be formed by cutting the device or element from a work piece.

The object of the invention is to provide an improved apparatus for cutting such shapes or elements from work pieces. Usually, the procedure is applicable to the cutting of metal. In accordance with the invention, an operating tool is so mounted that it may be moved relative to the work for performing the operation thereon and a similar control means is employed for governing the movements of the tool. The control means and the machine tool are of like construction, although not necessarily of the same size, and the controlling machine, which may be manipulated as determined by a suitable template or the like and the machine tool are synchronized so that like movements are given to the machine tool. The apparatus of the present invention is not limited to the cutting out of shapes from work pieces but may be employed for performing other operations on work pieces.

In accordance with the invention the machine tool embodies a member which is rotatably adjustable in a supporting structure; a second member rotatably mounted within the first adjustable member and the center of rotation of the second member is eccentrically positioned relative to the center of rotation of the first adjustable member; the second member supports the work performing tool and this work performing tool is positioned eccentrically relative to the second adjustable member with the arrangement preferably such that the tool may be adjusted to coincide with the center of rotation of the first adjustable member. Accordingly, the eccentricity of the second adjustable member relative to the first adjustable member is equal to the eccentricity of the tool relative to the second adjustable member. A like control means is provided and in the operation of the control means the two rotatably mounted members rotate or oscillate and the machine tool is operably connected thereto so as to move in synchronism therewith. The invention will be better understood as the following description is considered in connection with the accompanying drawings:

Fig. 4 is a view similar to Fig. 1 but illustrating the parts in a different position.

Fig. 7 is a cross sectional view taken substantially on line 7—7 of Fig. 5 showing the operating tool.

Figure 5:
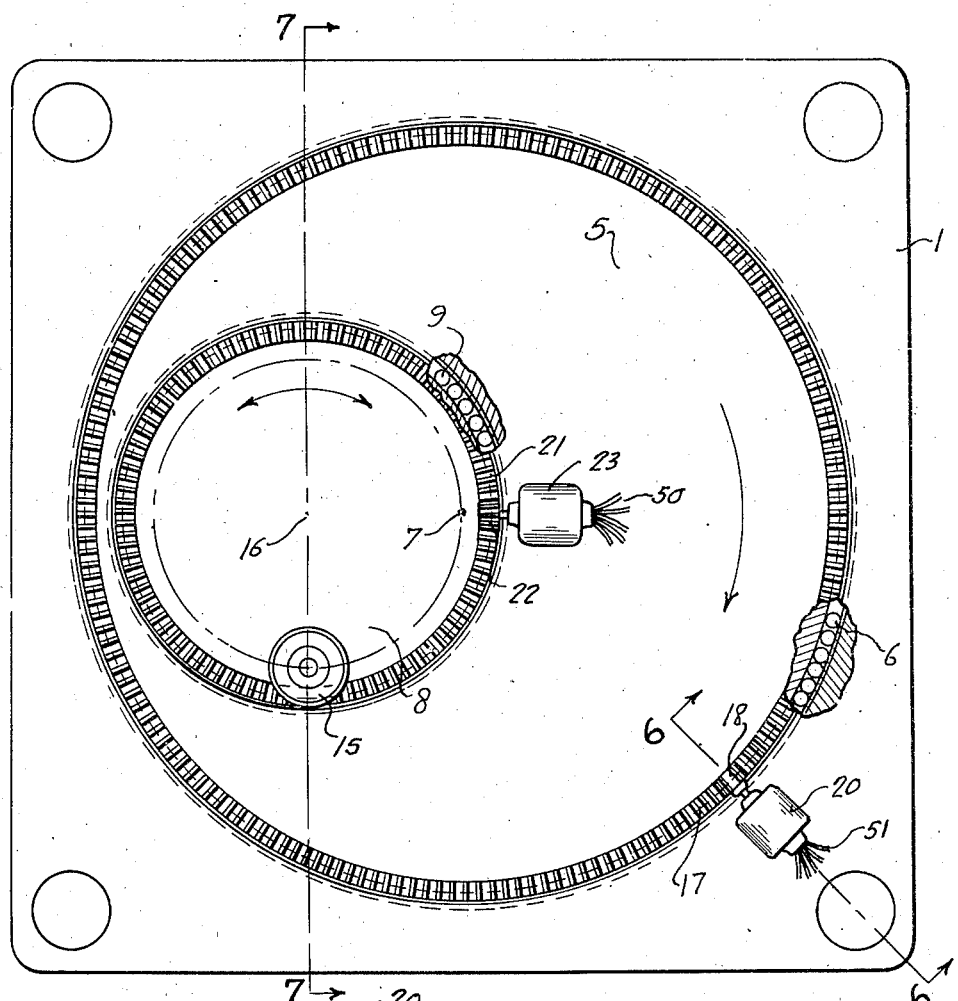
Fig. 5 is a plan view of the machine with some parts cut away and showing the tool mounted thereon.
Figure 6:
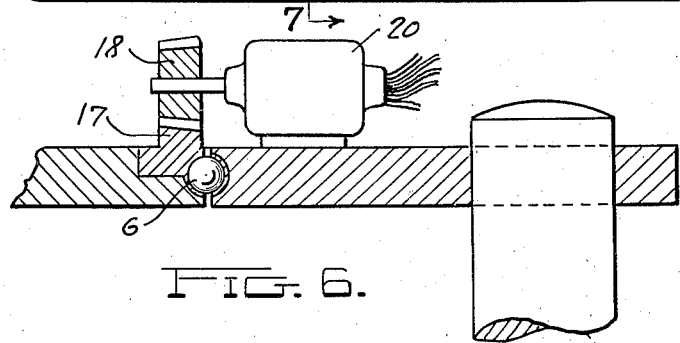
Fig. 6 is an enlarged sectional view taken on line 6—6 of Fig. 5.

It is probably better to first describe the machine for the operating tool and in this connection reference may be made to Figs. 5, 6 and 7. There is a suitable supporting structure 1 mounted as by means of posts 2 over a base 3 for supporting the work W. The base 3 may be grooved or recessed as at 4 for accommodating the operating tool.

Rotatably mounted in the support 1 is a plate-like element 5. This may be termed the first rotatably mounted member. It is suitably mounted in the support 1 for easy rotation or oscillation as, for example, by ball bearings 6 around its peripheral edge. The member 5 rotates about the center 7. Eccentrically disposed and rotatable or oscillatable of the member 5 is a second member 8. This may be mounted on ball bearings 9. This member carries a suitable operating tool 10 such as a routing tool as illustrated in Fig. 7, preferably driven by an electric motor 15 mounted on the member 8. The member 8 moves about its center 16 and the center of the tool 10 is preferably on a radius so that it moves in an arcuate path as shown by the broken lines in Fig. 5, which path intersects the center 7 of the member 5.

Suitable means are provided for moving the members 5 and 8 in a controlled manner as will later appear and one form of means is shown herein. The member 5 is provided with a ring gear or rack 17 and the teeth of a gear 18 meshes therewith, the gear being driven by a motor 20. The member 8 is similarly provided with a ring gear or rack 21, the teeth of which mesh with a gear or pinion 22 driven by a motor 23 which is mounted on the member 5.

Figure 1:
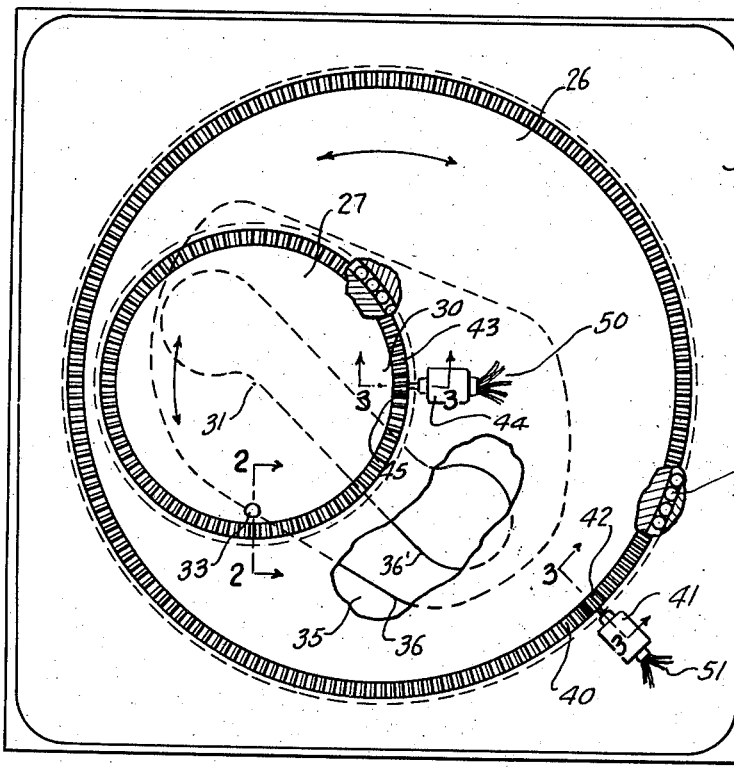
Fig. 1 is a plan view with some parts cut away and some parts shown in dotted lines of the control element.
Figure 2:
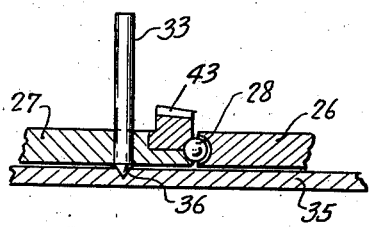
Fig. 2 is an enlarged cross sectional view taken substantially on line 2—2 of Fig. 1 showing the mounting and the template arrangement.
Figure 3:
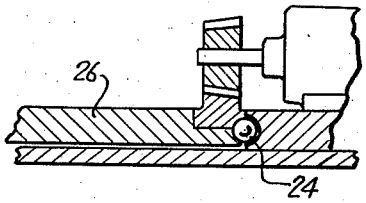
Fig. 3 is an enlarged sectional view taken substantially on line 3—3 of Fig. 1 showing an operating structure.
Figure 8:
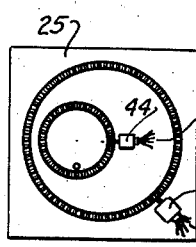
Fig. 8 is a diagrammatic view showing both the control element and the machine element.
Figure 8:
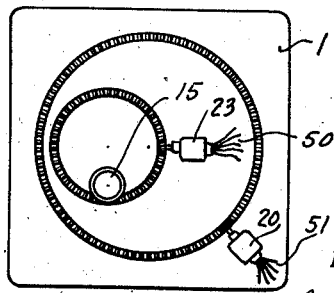

The controlling means is illustrated in Fig. 1 and it comprises a support 25 in which is rotatably mounted a member 26 as by means of ball bearings 24. Eccentrically disposed in the member 26 is a member 27 rotatably mounted as by means of ball bearings 28. The members 26 and 27 are replicas of the machine elements 5 and 8 in that the same relative proportions are used although not necessarily of the same size. The center of rotation of the member 26 is illustrated at 30 and the center of rotation of the member 27 is shown at 31. A stylus or follower 33 is mounted on the member 27 preferably on a radius equal to the distance between the centers 30 and 31 so that the stylus may intersect or coincide with the center 30 with the outer member 26. Thus, the eccentricity of the member 27 relative to the member 26 and the eccentricity of the follower in the member 27 are equal. Associated with the control device illustrated in Fig. 1 is a template or form 35 for cooperation with the follower 33. In the form illustrated in the example, the template is provided with a groove 36 and the follower 33 operates therein. As a further example, two template forms are illustrated in Fig. 1, one of which is at 36 and another of which is at 36'.

The member 26 is equipped with means for synchronizing its movements with the member 5 of the machine such, for example, as a ring gear 40 and a generator 41 with a gear or pinion 42 cooperating with the ring gear 40. The inner member 27 also has a ring gear formation 43, a generator 44 with a gear on its shaft at 45 cooperating with the ring gear 43. While the members 5 and 8 of the machine, and members 26 and 27 of the control means are described as being rotatably mounted, it is to be recognized that in some cases they may be mounted so that they do not rotate a full 360 degrees, but may only oscillate through a suitable angle. The description is intended to cover such an arrangement.

In the manipulation of the control member 1, the follower 33 is caused to traverse the template as by means of the moving of the follower or stylus to cause it to traverse the template groove 36 or the groove 36'. In the position shown in Fig. 1 the follower is located in a part of the groove 36 and as it is moved along the groove the members 26 and 27 are relatively rotated or oscillated. If, for example, a portion of the contour of the template approximates an arc around the center 30 most of the movement is given to the outer member 26; if a portion of the contour approximates an arc around the center 31 much of the movement is to the inner member 26. These are extreme conditions and a template contour other than on an arc around one of the centers will result in oscillation of both members if the follower moves along the template. The template groove 36 only exemplifies one shape. The template groove 36' is exemplary of another and rather radical form of a work piece. The entire template, however, must be within an area which can be traversed by the follower and thus must be within a circle described by the follower when it is in the position shown at x in Fig. 1, which is the furthest point of removal of the follower from the center 30. The same situation applies for the work and the tool.

Now the machine tool is synchronized with the control element so that the movements given to the control members 26 and 27 are given to the machine tool elements 5 and 8. One way of accomplishing this is by the system known as a Selsyn system. This system embodies self-synchronous instruments for transmitting accurate angular motion between two or more remote devices, a simple Selsyn system comprises two instruments connected together such, for example, as the element 44 and the element 23 on the one hand, and the element 41 and the element 20 on the other hand. These are connected by the wires 50 and 51. It is common to specify that the system comprises a Selsyn generator and a Selsyn motor. And in this case, the elements 41 and 44 are generators and the elements 20 and 23 are motors although they, in fact, are identical. This system is known to those versed in the art and needs no detailed explanation. Suffice it to say that in a simple Selsyn system, the two rotors are excited from a common source. If both rotors are free to turn they will take such a position that the voltage induced in the two stators are of balanced magnitude and displacement. Under this condition of stator voltage balance there is no circulating current in the stator windings. Now, if one rotor is displaced through a certain angle the stator voltage balance is altered and current will flow through the windings thus providing a torque to turn the other rotor to a position where the voltages are again equal and opposite. Thus, any motion given to the rotor of, for example, the generators 41 or 44, will be transmitted to the motors 20 and 23. Accordingly, the follower which traverses a template will result in the cutting tool, such as the tool 10, in following the same contour on the work piece W and, therefore, a shape or element is cut from the work piece. In some work, such as the cutting of large shapes from sheet stock for airplane work, the control element may be relatively small while the machine tool is large enough for the purpose. On the other hand, the control element and the machine tool may be about the same size or the control element may be larger than the machine tool all of which depends on the class and type of work and conditions encountered.

I claim:

1. An apparatus for performing operations on a work piece comprising in combination, a machine having a support, a first member rotatably mounted in the support, a second member eccentrically positioned and rotatably mounted in the first member, a tool carried by the second member at a point removed from the axis of the second member and adapted to perform operations on a work piece, a control device having an outer rotatably mounted member and an inner rotatably mounted member eccentrically positioned in the outer member, a follower mounted on the inner member at a point removed from the axis of the inner member, the first and second members and the tool of the machine and the outer and inner members and follower of the control being relatively comparable, a template positioned so that the follower may be guided thereby whereby the outer and inner members of the control relatively oscillate as the follower moves along the template and means interconnecting the machine and the control for transmitting the motion of the outer and inner members of the control in synchronized manner to the first and second member of the machine.

2. An apparatus for performing operations on a work piece comprising in combination, a machine having a support, a first member rotatably mounted in the support, a second member eccentrically positioned and rotatably mounted in the first member, a tool carried by the second member at a point removed from the axis of the second member and adapted to perform operations on a work piece, a control having a rotatably mounted outer member, an inner member eccentrically disposed and rotatably mounted in the outer member and a follower on the inner member positioned at a point removed from the axis of the inner member, the relative proportions of the first and second members and the position of the tool being substantially identical with the relative proportions of the outer and inner members and the position of the follower, a template arranged for guiding movement of the follower and electrical means for synchronously transmitting to the first and second members of the machine movement corresponding to the movement of the inner and outer members of the control whereby the tool traverses the work as dictated by the template.

ROSS A. NOBLE.